United States Patent [19]

Voirol et al.

[11] Patent Number: 4,854,988
[45] Date of Patent: Aug. 8, 1989

[54] PROCESS FOR THE PRODUCTION OF A FIBER-REINFORCED SYNTHETIC RESIN CONTAINER

[75] Inventors: Peter Voirol, Oberwil; Urs Moser, Muttenz, both of Switzerland

[73] Assignee: Ciba-Geigy Corporation, Ardsley, N.Y.

[21] Appl. No.: 79,980

[22] Filed: Jul. 31, 1987

[30] Foreign Application Priority Data

Aug. 11, 1986 [CH] Switzerland .................... 3215/86

[51] Int. Cl.⁴ .................................................. B65H 81/00
[52] U.S. Cl. ........................................ 156/155; 156/173; 156/175; 156/267; 220/3; 220/414
[58] Field of Search .............. 156/172, 173, 175, 267, 156/425, 155, 180, 429; 220/3, 414; 242/7.21, 7.22

[56] References Cited

U.S. PATENT DOCUMENTS

| | | | |
|---|---|---|---|
| 2,848,133 | 8/1958 | Ramberg | 156/173 X |
| 3,047,191 | 7/1962 | Young | 156/173 X |
| 3,220,910 | 11/1965 | Walkey | 156/155 X |
| 3,282,757 | 11/1966 | Brussee | 156/172 X |
| 3,312,575 | 4/1967 | Corbin, Jr. | 156/155 X |
| 3,367,815 | 2/1968 | Ragettli | 220/3 X |
| 3,908,851 | 9/1975 | Jacobs | 220/414 X |
| 3,971,124 | 7/1976 | Sasaki et al. | 156/172 X |
| 4,053,081 | 10/1977 | Minke | 156/175 X |
| 4,732,634 | 3/1988 | Marks | 156/173 X |

OTHER PUBLICATIONS

K. Hillermeier, Arenka–eine Faser zur Kunststoff–Verstärkung, p. 31.1 (1974).

Primary Examiner—Michael W. Ball
Assistant Examiner—Jeff H. Aftergut
Attorney, Agent, or Firm—Harry Falber

[57] ABSTRACT

A container of hardened, fiber-reinforced synthetic resin and high stability is manufactured by forming a wound-up structure on a shaping core born on the shaft of a winding machine together with fittings for the two open container ends, of different size, and being clamped against the two core ends by means of fixing members held in position on the winding shaft during winding. One of the fittings is provided with an annular groove for anchoring the wound-up structure therein. The fixing members and fittings are of such shape that the winding affords a wound-up structure having end openings of equal size so that a geodetic depositing of the wrapped layers is possible. After the structure is hardened, the portion thereof extending beyond the fitting having an opening of larger diameter than that closed by the other fitting is cut off, so that a container closed by the first fitting and open through the second fitting is obtained. Between the fittings and the wound-up fiber-reinforced structure inserts of elastic, temperature-resistant material can be provided which prevents detachment of the fittings from the structure, so that the resulting container is leak-free.

5 Claims, 2 Drawing Sheets

PROCESS FOR THE PRODUCTION OF A FIBER-REINFORCED SYNTHETIC RESIN CONTAINER

BACKGROUND OF THE INVENTION

This invention relates to a process for the production of a pressure container from a fiber-reinforced synthetic resin material, consisting of a wound-coil structure having opposite polar openings of different sizes and connecting elements integrated therein at both ends, the coiled structure being produced by applying to the shaping core or mandrel mounted on the winding shaft of a winding machine, under determined winding angles, reinforcing fibers impregnated with a hardenable synthetic resin (pre-polymerizate); the assembled structure is then fully hardened by heating and cooled down after hardening is complete. The invention further relates to a synthetic resin container produced by this process, comprising a fiber-reinforced structure.

In the manufacture of aircraft and motor vehicles, where light weight and a high stress resistance are of importance, synthetic resin pipes and containers which are fiber-reinforced are being increasingly used. These pipes and containers are usually provided at their ends with connecting elements which are referred to as "fittings". The attachment of such elements which are often subject to high stresses, to a fiber-reinforced structure such as a container or pipe frequently causes certain often major problems, e.g., leakage or peeling from fittings.

In manufacturing fiber-reinforced, wound-up synthetic resin containers, the fibers are wound about a shaping core on a shaft of a winding machine, with predetermined winding angles which are adjusted to the demands of mechanical strength and shape made upon the final product.

The smallest winding angle w of a cross winding made by geodetic depositing of fibers in a polar, i.e. an end region, of a container, can be calculated with the help of the equation $$\sin(w) = d/D$$

wherein d is the polar diameter (e.g. the diameter of the opening at a narrow end of the container), at which the direction in which the windings are laid on the core is altered, and D is the diameter of the cylindrical portion of the container.

In important kinds of use, the "fittings" to be connected to the preferably open ends of a container are usually of different polar diameter. If the joint between container ends and the connected fittings is subject to high mechanical stresses, a geodetic deposition of the fibers should be used. However, such deposition conforming with the above equation requires that the polar openings of the container are of equal size.

OBJECTS AND SUMMARY OF THE INVENTION

It is therefore an object of the invention to provide a process for producing a fiber-reinforced artificial resin container having polar openings of different diameters and being equipped with fittings, using a known winding machine of standardized type, and to achieve nevertheless optimal joints between the container and the fittings which can be subject to high mechanical stresses.

It is another object of the invention to provide a process of the last-mentioned kind in which mechanical longitudinal forces are introduced on at least one side of the aforesaid container to be formed into a fitting thereof the diameter of which is larger than the narrower opening diameter or diameter where reversal of the winding takes place from forward to rearward depositions which narrow diameter is needed for a geodetic depositing of the fibers during winding.

It is also an object of the invention to provide a process of the above-mentioned kind in which peeling of the fiber structure from the fittings will be prevented even when there is noticeable mechanical and/or thermic incompatibility between the said structure and the fittings.

These objects and others that will become apparent from the further description of the invention hereinafter, will be attained, in accordance with the invention, by a process of the initially-described kind, which comprises the following steps:

(a) the mandrel or shaping core of the winding machine is supplemented, at the pole end thereof destined for the larger one of the two polar openings, by a flange tapered down to a diameter equal to that intended for the smaller polar opening, (b) applying at least a portion of the fibers onto the thus supplemented mandrel under a smallest winding angle ±w corresponding to the equation $$\sin(w) = d/D,$$

wherein d is the diameter of the smaller polar opening and D the diameter of the cylindrical part of the container.

(c) after the winding-up step, the coiled structure is fully hardened and cooled down, and finally (d) severing the portion of the coiled structure extending beyond the pole end with the polar opening of the largest diameter.

Preferred modes of carrying out the process according to the invention in practice comprise at least one of the following features:

The winding structure of at least one of its two ends is wound directly onto the fitting, and there is, moreover, used as the mandrel a member shaped from a material which can be dissolved out of the container after the hardening treatment.

At least one of the two fittings joined to the wound-up structure is provided with a groove, and, within the range of that groove, there is wound, on top of winding applied under the determined angle, a circumferential winding which presses the windings part present in the range of the groove into the latter. Preferably, the circumferential winding is applied to the region of the groove, at least in part alternatingly with individual layers of the windings to be applied under a determined angle, thereby squeezing the portion of the wound-up structure lying across the groove firmly into the latter.

Those surface parts of the fittings on which the wound-up structure is to be deposited, are covered with a layer of temperature-resistant elastic material prior to the winding step. In this case, there is preferably provided between the fitting and the adjacent container segment a layer of material in the form of a foil of temperature-resistant elastic rubber.

The last-mentioned features serve to take care of mechanical or thermic incompatibility between the fiber structure and the fittings, by permitting relative displacement of windings on the fitting, which are to be expected, thanks to this elastic and temperature-resistant material without danger of peeling. Preferably, the elastic material is glued or frictionally connected with the respective fitting.

BRIEF DESCRIPTION OF THE DRAWING

Further objects and advantages of the invention will become apparent from the following description thereof in connection with the accompanying drawings in which.

DETAILED DESCRIPTION OF PROCESS AND EMBODIMENT SHOWN IN THE DRAWINGS

Figure 1:
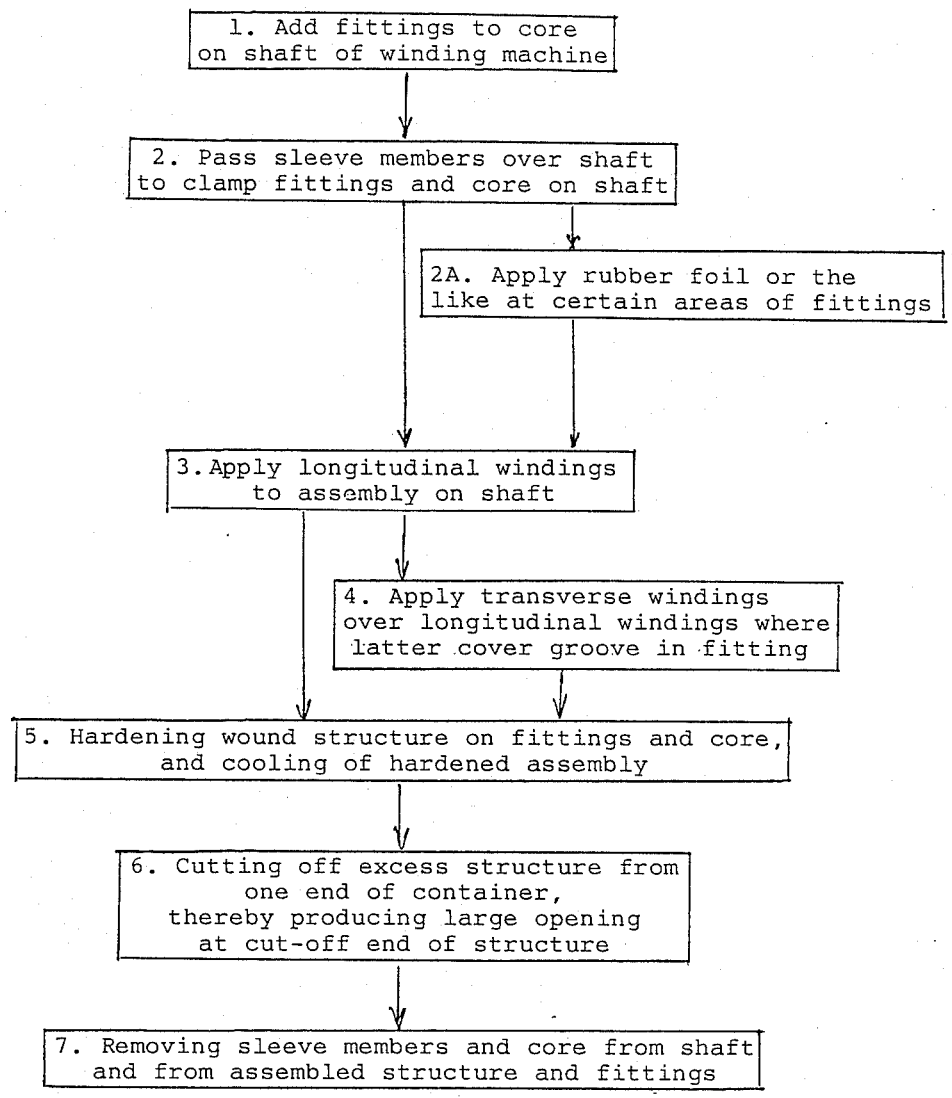
FIG. 1 is a flowsheet representing a preferred mode of carrying out the process according to the invention in practice.

The preferred mode of the process according to the invention illustrated in FIG. 1 is carried out as follows:

Step 1: adding to the core 12 mounted on the shaft 11 of a winding machine, by passing from a first end of the shaft a first fitting 3 of minor diameter into contact with one end face of the core, and by passing from the other shaft end a second fitting 4 of major diameter, and having a peripheral wall and an annular groove 6 therein, into contact with the other core end face.

Step 2: passing over the first shaft end a fixing sleeve 13 into contact with the first fitting and fastening the sleeve member in position on the shaft; and passing over the other shaft end a second fixing member 14, having a flange part of the same major diameter as the second fitting 4 and a bushing part 17 having the same major diameter as the first fitting, into contact between the flange part and the second fitting 4, and fastening the second fixing member 14 in position on the shaft 11, thereby clamping the two fittings and the core 12 therebetween on the shaft 11.

Step 3: applying general longitudinal windings 1 of fibers and hardenable synthetic resin onto the assembly resulting from Step 2 to produce a wound-up envelope of fibers having one opening about the first fitting 3 and having an opposite opening about the bushing part 17 of the second fixing member 14; and Step 4: applying a transverse winding 7 above the longitudinal windings 1 in the region of the angular groove 6 to urge the latter windings 1 into the groove;

Step 5: fully hardening the applied windings and cooling the resulting hardened wound body down.

Step 6: cutting-off from the portion of first windings 1 in a wound body resulting from Step 5 and extending from the region of core 12 across the groove 6 in the second fitting 4 that excess portion extending beyond the groove 6 onto the flange part and ending about the bushing part 17 of the second fixing member 14.

Preferably, in Step 3 at least a portion of the fibers is wound onto the thus supplemented core under a smallest winding angle ±w corresponding to the equation $$\sin(w) = d/D,$$

wherein d is the diameter of the smaller polar opening and D the diameter of the container.

In a preferred additional Step 2A between Step 2 and 3, a layer 8 of temperature-resistant elastic material is applied in those areas of the fittings to which the windings of Step 3 are to be applied. On the second fitting 4 this area should consist at least of a flank wall of the groove 6.

Figure 2:
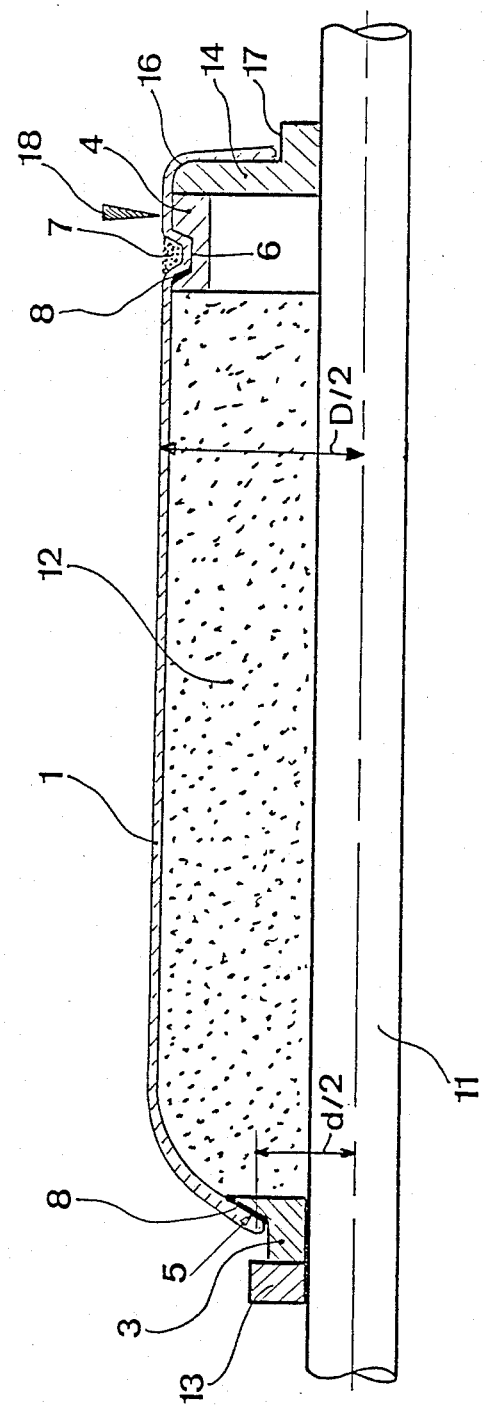
FIG. 2 is a longitudinal sectional view of a part of a winding machine and of the upper half of a preferred embodiment of an assembly of the container according to the invention made from fiber-reinforced synthetic resin, and fittings therefor.

The assembly the upper half of which is shown in FIG. 2 together with the winding shaft 11 of a winding machine, comprises the completely wound-up structure 1 of an elongated container and the fittings 3 and 4 attached at the two container ends. The shaft 11 of the winding machine, of which other conventional parts have not been illustrated, bears a shaping core 12 and near one end of the latter a smaller, sleeve-shaped fixing member 13 and near the other end of the core 12, a larger flange member 14 having a rearwardly projecting socket part 17 and a flat annular face on the side of the flange member 14 turned away from the core 12, which annular face merges in a circumferential curved portion 16 with the peripheral wall of the flange member 14, both of which are axially displaceable on the shaft and can be rested in such chosen positions distanced from the two core ends that the fitting 3 at the forward end and the fitting 4 at the rearward end are held firmly against front and rear end faces of the core 12. The fitting 3 is shown to be a bushing having a flange part, turned toward the forward end face of the core 12 and bearing on its side turned away from the core tapered annular shoulder 5, while the fitting 4 is an annular body having a peripheral outer wall in which there is provided an annular groove 6. The fittings 3 and 4 are clamped in position on contact with the end faces of the core 12 by means of the two fixing members 13,14 having conventional arresting means (not shown).

A fiber-reinforced wound structure 1 is wrapped about the core 12 and extends on the one hand on to the shoulder 5 of the forward fitting 3 and, on the other hand, across the annular groove 6 of the rearward fitting 4 on to the curved portion 16 and downwardly on the rearward annular face of the flange member 14 about the bushing part 17 of the latter. A foil 8 of elastic material is inserted between the fiber-reinforced structure 1 and the annular shoulder 5, on the one hand, and the annular groove 6, wherever there is contact between them. The wound structure 1 is squeezed with the aid of circumferential windings 7 of fiber material into the groove 6. Finally, cutting means 18 are provided in the winding machine, by means of which the excessive portion of the wound structure extending beyond the rearward annular groove 6 can be severed.

The process according to the invention is preferably carried out in practice by the following steps:

(a) The shaping core 12 is manufactured from a material which can be removed easily from the wound structure 1 after the production of the same has been complete. For example, urea or molding sand are suitable materials to this end.

(b) The shaping core 12 together with the two fittings 3 and 4 is brought on to the shaft 11 and is clamped in position thereon by means of the fixing members 13 and 14.

(c) The winding or wrapping process can now begin. The winding angle w is calculated from the above-mentioned formula, magnitudes D/2 and d/2 being shown in FIG. 1. In order to comply with the winding conditions the winding is carried to the rearward end to wrap the fiber-reinforced web or strip of material across the rearward fitting 4 on to the flange member 14. The wound structure is being shaped with a contour such that the external contour of the wrapped fitting 4 merges without steps into that of the wrapped flange member 14; this is achieved with the aid of the curved rim about the face of the flange member 14 which is turned away from the core 12, and ends at the rearwardly protruding socket part 17 whose diameter corresponds to that of the sleeve 3 at the opposite, forward end of the core 12. The winding structure 1 ends at this socket part 17.

This feature affords an equal size of the diameter of the openings at both ends of the wound-up structure, which condition renders the above-stated equation applicable. It is not of great importance whether the shoulder 5 has a steeper or flatter inclination relative to the cylindrical part of the fitting 3 or whether it gradually merges with the cylindrical wall of the latter. This shape can therefore be adapted conveniently to the individual requirements of the available tools.

The groove 6 of the rearward fitting 4(on the right hand side in FIG. 2) serves for anchoring the structure 1, being wound on the core 12 during the winding operation.

In order to have the wound structure 1 rest as firmly as possible in the groove 6, it is squeezed down into the same by a circumferential or cover wrapping 7. It is recommended to apply this cover wrapping alternatingly over each layer of main windings. Thereby the wound structure is pressed each time positively into the groove 6.

After winding of the structure 1 is completed and the structure has been hardened, the portion of the wound structure 1 extending rearwardly beyond the groove 6 can be cut off by means of severing means 18.

In practice such containers made according to the invention can be subjected to enormous stresses. This is especially the case when the container serves as the casing for a solid fuel rocket which is employed, for instance, against avalanches or hail. At the forward fitting 3 of such rockets there are attached such accessories as guiding means, while the supporting wings may be mounted on the rearward fitting 4.

Another requirement made on such containers which is difficult to meet is that of resistance to very high and very low temperatures. Thus, in combating avalanches, a resistance to temperatures as low as $-40°$ to $-50°$ C. is required. Once the rocket has been fired, temperature in its interior may rise to $\pm 1000°$ C. In order to meet the requirements of temperature resistance, differences between coefficients of thermal expansion of the materials employed especially for the fittings 3, on the one hand, and for the wound-up structure 1, on the other hand, will play a most important part. If the wound-up structure 1 were fastened directly on the fittings 3 and 4 it would not be possible to prevent the fitting 3 or the fitting 4 to become detached from the wound-up structure 1, depending on the difference between the respective coefficients of thermal expansion, causing the pressure container to leak.

These differences are avoided by inserting the layer 8 of temperature-resistant elastic material between the shoulder 5 or the rims of the groove 6, respectively, and the wound-up structure 1. Excellent results were obtained when using an inserted foil of temperature-resistant synthetic rubber such as styrene-butadiene caoutchouc foil having a thickness of 0.2 mm, a Shore hardness of A 62 to 64, a tensile strength of 15 to 20 MPa, an elongation at break of 350 to 400%, and a structural resistance (Trowers Test, according to DIN 53507) of 4 to 8 N/mm.

Fiber-reinforced multi-layer bodies from epoxy resin and carbon fibers are, for instance, described in German Offenlegungsschrift No. 27 10 275.

Hardenable synthetic resin material usable in the process according to the invention are low viscosity hardenable epoxy resin systems, low viscosity unsaturated polyester resin systems and phenol resins. Such resin systems are reactive mixtures of hardenable resin, hardening agent, optional accelerators, optional fillers and optionally other conventional additives.

As the resin component to be fiber-reinforced, there are preferably used thermosetting or thermoplastic resins, more specifically polyamide, polyester, polysulfone, polycarbonate, polyethersulfone, polyphenylene sulfide, polyvinylidene fluoride, polyether-etherketone, or epoxy resins of suitable compression strength, hardness and other desired mechanical properties.

Reinforcing fibers adapted for incorporation in such resin systems are glass fibers, carbon fibers, especially of high strength and rigidity, boron fibers, ceramic fibers, or aramid (aromatic polyamide) fibers, such as Arenka fibers described by K. Hillemeyer in "ARENKA- eine Faser zur Kunststoffverstärkung" published by ENKA Glanzstoff AG, D-5600 Wuppertal 1, page 31.1 (1974), and poly-p-benzamide type fibers marketed by Dupont de Nemours Corporation, Wilmington, Del., as Kevlar fibers. Bare fibers in strand form, of a typical Kevlar-49 fiber tested with a 25.4 cm gage and a twist of 1.2 turns/cm showed the following properties; a strength of 2758 MPa(400 ksi), an elongation of 2%, a modulus of 131.0 GPa (19.10$^6$ psi), a filament diameter of 11.7 micrometers and 285 filaments per strand end; the average cross-sectional area of the strand was $2.82 \times 10^{-4}$ cm$^2$. The poly benzamide fiber contained 69.6%C, 4.2%H, 11.8%N and 13.5%O, about 500 ppm Ca, 50 ppm Mg, 50 ppm Na, 40 ppm Si, 20 ppm Fe and 15 ppm Al as well as 11 ppm of other impurities, in particular Pb, Ti, B and Cu.

We claim:

1. A process for the production of a fiber-reinforced synthetic resin container, comprising
    (a) adding to a core having a first diameter which is mounted on a shaft of a winding machine, by passing on the shaft from a first end thereof a first fitting having a second diameter smaller than said first diameter into contact with one end face of the core, and by passing on the shaft from the other shaft end a second fitting having a third diameter larger than said second diameter but smaller than said first diameter into contact with the other core end face;
    (b) passing over the first shaft end a sleeve member into contact with the first fitting and fastening the sleeve member in position on the shaft; and passing over the other shaft end a fixing member, having a flange part of the same diameter as the second fitting and tapering down into a socket part having the same diameter as the first fitting, such that the flange part contacts the second fitting, and fastening the fixing member in position on the shaft, thereby clamping the two fittings and the core between said sleeve member and said fitting member on the shaft;

(c/d) applying first windings of fibers and hardenable synthetic resin onto the assembly resulting from Step (b), at least a portion of said fibers being applied under a smallest winding angle ±w with respect to said shaft corresponding to the equation sin (w)-d/D wherein d is the second diameter and D is the first diameter, thereby producing a wound-up body of fibers having a first polar opening about the first fitting and having an opposite opening of substantially the same diameter as the first polar opening about the socket part of the fixing member;

(e) fully hardening the applied windings by exposing them to heat curing and cooling the resulting hardened wound body; and (f) cutting-off from the structure of said hardened wound body resulting from Step (e) and extending from the region of the core across the second fitting the excess portion extending beyond said second fitting onto the flange part and ending about the socket part of the fixing member.

2. The process of claim 1, wherein said second fitting has a peripheral wall and an annular groove therein and which process further comprises in step (c/d)
applying a transverse winding above the first fiber windings in the region of the angular groove to urge said fiber windings into the groove.

3. The process of claim 2, wherein layers of said first windings are lodged alternatingly with layers of said transverse winding on said peripheral wall of said second fitting in the region thereof containing said annular groove.

4. The process of claim 1, further comprising between steps (b) and (c/d) the additional step of
applying a layer of temperature-resistant elastic rubber material in those areas of the fittings to which the first windings are to be applied.

5. The process of claim 1, wherein said core is of a material dissolvable in a solvent, and wherein the core is dissolved and thereby removed from the container body resulting from Step (f).

* * * * *